(12) United States Patent
Choi et al.

(10) Patent No.: US 10,756,339 B2
(45) Date of Patent: Aug. 25, 2020

(54) POSITIVE ACTIVE MATERIAL, POSITIVE ELECTRODE, AND LITHIUM BATTERY INCLUDING THE SAME AND METHOD OF MANUFACTURE THEREOF

(71) Applicant: SAMSUNG SDI CO., LTD., Yongin-si, Gyeonggi-do (KR)

(72) Inventors: Jae-Won Choi, Yongin-si (KR); Sang-In Park, Yongin-si (KR); Jae-Hong Lim, Yongin-si (KR); Yong-Chan You, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 484 days.

(21) Appl. No.: 14/598,175

(22) Filed: Jan. 15, 2015

(65) Prior Publication Data

US 2015/0243970 A1 Aug. 27, 2015

(30) Foreign Application Priority Data

Feb. 27, 2014 (KR) .................. 10-2014-0023713

(51) Int. Cl.
*H01M 4/04* (2006.01)
*H01M 4/36* (2006.01)
(Continued)

(52) U.S. Cl.
CPC .......... *H01M 4/366* (2013.01); *H01M 4/0471* (2013.01); *H01M 4/133* (2013.01);
(Continued)

(58) Field of Classification Search
CPC ...... H01M 4/366; H01M 4/505; H01M 4/133; H01M 4/0471; H01M 4/525; H01M 4/5825; H01M 10/052
(Continued)

(56) References Cited

U.S. PATENT DOCUMENTS 8,658,316 B2 2/2014 Kitagawa et al.
2003/0082448 A1 5/2003 Cho et al.
(Continued)

FOREIGN PATENT DOCUMENTS

JP 2007-335331 A 12/2007
JP 2009-140876 A 6/2009
(Continued)

OTHER PUBLICATIONS

SciFinder search history for 14-598175 (May 25, 2016).*
(Continued)

*Primary Examiner* — Robert S Jones
*Assistant Examiner* — Claire L Roe
(74) *Attorney, Agent, or Firm* — Lewis Roca Rothgerber Christie LLP

(57) ABSTRACT

A positive active material, a method of preparing the positive active material, a positive electrode including the positive active material, and a lithium battery including the positive active material are disclosed. The positive active material includes a core and a coating layer on the core. The coating layer includes a sulfur component. When a binding energy peak of the sulfur is measured by X-ray photoelectron spectroscopy (XPS), the binding energy peak is observed at about 165 eV to about 168 eV, and the stability of the positive active material may be improved due to the coating layer. Accordingly, the lifespan properties of a lithium battery including the positive active material may be improved.

10 Claims, 8 Drawing Sheets

(51) Int. Cl.
*H01M 4/525* (2010.01)
*H01M 4/505* (2010.01)
*H01M 10/052* (2010.01)
*H01M 4/58* (2010.01)
*H01M 4/133* (2010.01)
*H01M 4/02* (2006.01)

(52) U.S. Cl.
CPC ........... *H01M 4/505* (2013.01); *H01M 4/525* (2013.01); *H01M 4/5825* (2013.01); *H01M 10/052* (2013.01); *H01M 2004/028* (2013.01); *Y02T 10/7011* (2013.01)

(58) Field of Classification Search
USPC ..... 427/126.1, 126.3, 126.6; 429/220, 218.1, 429/221, 223, 224, 225, 229, 231.5, 429/231.6, 231.9, 231.95
See application file for complete search history.

(56) References Cited

U.S. PATENT DOCUMENTS

| | | | |
|---|---|---|---|
| 2007/0015053 A1* | 1/2007 | Morris | H01M 4/0416 429/212 |
| 2007/0292764 A1 | 12/2007 | Soma et al. | |
| 2009/0061313 A1* | 3/2009 | Tadano | H01M 4/62 429/217 |
| 2010/0261063 A1* | 10/2010 | Kitagawa | C01B 25/37 429/232 |
| 2012/0107686 A1* | 5/2012 | Ryu | C01G 53/42 429/215 |
| 2013/0004657 A1 | 1/2013 | Xu et al. | |
| 2013/0032753 A1 | 2/2013 | Yamamoto et al. | |

FOREIGN PATENT DOCUMENTS

| | | | |
|---|---|---|---|
| JP | 2010-9960 A | | 1/2010 |
| JP | 2013-161597 A | | 8/2013 |
| KR | 2002-0095421 A | | 12/2002 |
| KR | 10-2004-0111488 A | | 12/2004 |
| KR | 101139677 B | * | 7/2010 |
| KR | 10-2012-0132485 A | | 12/2012 |
| WO | WO 03/085755 A2 | | 10/2003 |

OTHER PUBLICATIONS

Sigma-Aldrich-SDS (https://www.sigmaaldrich.com/catalog/product/sial/436143?lang=en&region=US) (Year: 2019).*
Sigma-Aldrich-S (https://www.sigmaaldrich.com/catalog/product/sigald/84683?lang=en&region=US) (Year: 2019).*
Machine English Translation of JP 2010-009960 A, 38 pages.
Chung, Youngmin et al., A Surfactant-based Method for Carbon Coating of $LiNi_{0.8}Co_{0.15}Al_{0.05}O_2$ Cathode in Li Ion Batteries, Bull. Korean Chem. Soc., 2010, vol. 31, No. 8, pp. 2304-2308, Youngmin Chung et al.
Ju, Jeong-Hun et al., "Electrochemical performance of $Li[Co0.1Ni0.15Li0.2Mn0.55]O2$ modified by carbons as cathode materials," Electrochimica Acta, vol. 56, 2011, 6 pages.
Korean Registration Determination Certificate dated Mar. 12, 2020, for corresponding Korean Patent Application No. 10-2014-0023713 (8 pages).

* cited by examiner

POSITIVE ACTIVE MATERIAL, POSITIVE ELECTRODE, AND LITHIUM BATTERY INCLUDING THE SAME AND METHOD OF MANUFACTURE THEREOF

CROSS-REFERENCE TO RELATED APPLICATION

This application claims priority to and the benefit of Korean Patent Application No. 10-2014-0023713, filed on Feb. 27, 2014, in the Korean Intellectual Property Office, the entire content of which is incorporated herein by reference.

BACKGROUND

1. Field

One or more embodiments of the present invention relate to a positive active material, a positive electrode and a lithium battery including the positive active material, and a method of manufacturing the positive active material.

2. Description of the Related Art

With the advancement of small high tech devices such as digital cameras, mobile devices, notebook computers, and personal computers, the demand for lithium secondary batteries (which are energy sources for the small high tech devices) has dramatically increased. Also, stable lithium ion batteries having high capacity are currently being developed for electric cars, such as hybrid electric vehicles (HEV), plug-in hybrid electric vehicles (PHEV), and electric vehicles (EV).

Various positive active materials are currently being studied to develop a lithium battery that is suitable for the purposes described above.

As a positive active material for a lithium secondary battery, a single-component lithium cobalt oxide ($LiCoO_2$) is primarily used (utilized); however, use (utilization) of lithium composite metal oxides ($Li(Ni-Co-Mn)O_2$, $Li(Ni-Co-Al)O_2$, or the like) having layered-structures and high capacity has been increasing. Also, a spinel-structured lithium manganese oxide ($LiMn_2O_4$) and an olivine-structured iron phosphate lithium oxide ($LiFePO_4$) having high safety features are receiving attention.

SUMMARY

One aspect of the present disclosure relates to a positive active material having improved stability, in which a coating layer including a sulfur component is formed on a surface of a core.

Another aspect of the disclosure relates to a positive electrode including the positive active material.

Another aspect of the disclosure relates to a lithium battery including the positive electrode and having improved lifespan properties.

Another aspect of the disclosure relates to a method of preparing the positive active material.

Additional aspects will be set forth in part in the description which follows and, in part, will be apparent from the description, or may be learned by practice of the presented embodiments.

According to an embodiment of the disclosure, a positive active material includes: a core; and a coating layer on the core. The coating layer may include a sulfur(S) component, and when measured by X-ray photoelectron spectroscopy (XPS), a binding energy peak of the sulfur may be observed at about 165 eV to about 168 eV.

According to an embodiment of the disclosure, the core may include a lithium nickel composite oxide.

According to an embodiment of the disclosure, an amount of nickel may be at least 60 mole % based on a total number of moles of metal atoms except for lithium (i.e., excluding the number of moles for lithium) in the lithium nickel composite oxide.

According to an embodiment of the disclosure, the core may include a lithium nickel composite oxide represented by Formula 1:

$$Li_a(Ni_xM_y'M_z'')O_2 \qquad \text{Formula 1}$$

In Formula 1, M' may be at least one of Co, Mn, Ni, Al, Mg, or Ti; and M" may be at least one of Ca, Mg, Al, Ti, Sr, Fe, Co, Mn, Ni, Cu, Zn, Y, Zr, Nb, or B, where $0.8 < a \leq 1.2$, $0.6 \leq x \leq 1$, $0 \leq y \leq 0.4$, $0 \leq z \leq 0.4$, and $x+y+z \leq 1.2$.

According to an embodiment of the disclosure, the core may include a lithium nickel composite oxide represented by Formula 2:

$$Li_a(Ni_xCo_yMn_z)O_2 \qquad \text{Formula 2}$$

In Formula 2, $0.8 < a \leq 1.2$, $0.6 \leq x \leq 1$, $0 \leq y \leq 0.4$, $0 \leq z \leq 0.4$, and $x+y+z \leq 1.2$.

According to an embodiment of the disclosure, an amount of sulfur may be about 0.01 wt % to about 10 wt % based on a total weight of the positive active material.

According to an embodiment of the disclosure, the coating layer may further include at least one element selected from the group consisting of an alkali metal, an alkaline earth metal, a transition metal, and a Group 15 element.

According to an embodiment of the disclosure, the coating layer may further include at least one element selected from the group consisting of lithium (Li), sodium (Na), potassium (K), rubidium (Rb), cesium (Cs), magnesium (Mg), calcium (Ca), aluminum (Al), silicon (Si), tin (Sn), lead (Pb), manganese (Mn), iron (Fe), chromium (Cr), nickel (Ni), zinc (Zn), zirconium (Zr), thallium (Tl), and nitrogen (N).

According to an embodiment of the disclosure, the coating layer may be a continuous coating layer.

According to another embodiment of the disclosure, a positive electrode includes the positive active material.

According to another embodiment of the disclosure, a lithium battery includes the positive electrode.

According to another embodiment of the disclosure, a method of preparing a positive active material includes: coating a surface of a core with a coating solution including a sulfate compound to prepare a coated core; and heat-treating the coated core to form a coating layer including a sulfur (S) component on the core. The positive active material includes: the core; and the coating layer on the core, and, the coating layer includes the sulfur (S) component, and when measured by X-ray photoelectron spectroscopy (XPS), a binding energy peak of the sulfur may be observed at about 165 eV to about 168 eV.

According to an embodiment of the disclosure, the sulfate compound may further include at least one element selected from the group consisting of an alkali metal, an alkaline earth metal, a transition metal, and a Group 15 element.

According to an embodiment of the disclosure, the sulfate compound may be represented by Formula 3:

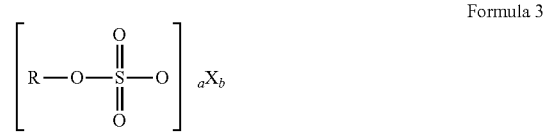

Formula 3

In Formula 3, R may be a substituted or unsubstituted aliphatic hydrocarbon group; X may be at least one selected from the group consisting of an alkali metal, an alkaline earth metal, a Group 13 element, a Group 14 element, a transition metal, a rare earth element, and an ammonium ion; $1 \le a \le 5$ and $1 \le b \le 5$.

According to an embodiment of the disclosure, the substituted or unsubstituted aliphatic hydrocarbon group may be a C1-C20 alkyl group; X may be at least one selected from the group consisting of $NH_4$, Li, Na, K, Rb, Cs, Mg, Ca, Al, Si, Sn, Pb, Mn, Fe, Cr, Ni, Zn, Zr, and Tl.

According to an embodiment of the disclosure, the sulfate compound may include at least one compound selected from the group consisting of sodium dodecyl sulfate (SDS), lithium dodecyl sulfate (LDS), ammonium lauryl sulfate (ALS), or sodium lauryl sulfate (SLS).

According to an embodiment of the disclosure, an amount of the sulfate compound may be about 0.01 parts by weight to about 10 parts by weight based on 100 parts by weight of the core.

According to an embodiment of the disclosure, the method may further include washing the core with distilled water before coating the surface of the core with the coating solution.

According to an embodiment of the disclosure, the heat-treating may include drying and calcination.

According to an embodiment of the disclosure, the calcination may be performed at a temperature of about 300° C. to about 1000° C. in air.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
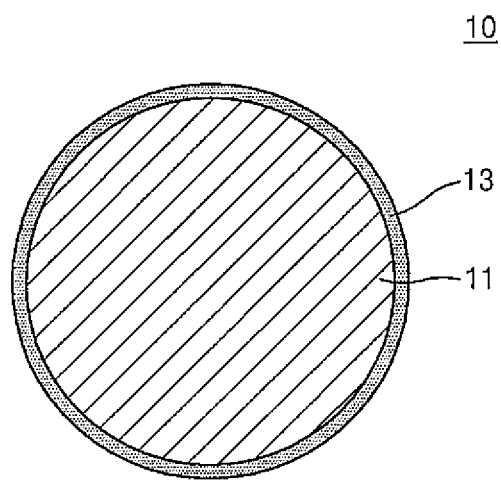
FIG. 1 is a schematic view of a structure of a positive active material according to an embodiment.

Reference will now be made to certain embodiments, examples of which are illustrated in the accompanying drawings, where like reference numerals refer to like elements throughout. In this regard, the presented embodiments may take different forms and should not be construed as being limited to the descriptions set forth herein. Accordingly, the presented embodiments are described below by referring to the figures to explain certain aspects of the present description. Expressions such as "at least one of," when preceding a list of elements, modify the entire list of elements and do not modify the individual elements of the list. Further, the use of "may" when describing embodiments of the present invention refers to "one or more embodiments of the present invention."

A positive active material according to an embodiment includes a core; and a coating layer on the core. The coating layer includes a sulfur (S) component.

FIG. 1 is a schematic view of a structure of a positive active material 10 according to an embodiment. As shown in FIG. 1, a coating layer 13 including a sulfur component is formed on a core 11.

According to an embodiment, the coating layer 13 may be a continuous coating layer. As used herein, the term "continuous coating layer" refers to a coating layer in which the core is completely coated (i.e., the coating covers the entire core 11). The coating layer 13 becomes integrated with the core 11 to prevent (reduce or prevent) side reactions (such as elution of a transition metal at a high temperature or gas generation) at high voltage.

In the coating layer 13, the sulfur component does not react with the electrolyte, and thus, side reactions with the electrolyte may be prevented (reduced or prevented) due to the coating layer 13 including a sulfur component. Accordingly, during charge and discharge of the battery, structural changes to the surface of the positive active material may be prevented (reduced or prevented) to improve the stability and lifespan properties of the lithium battery including the positive active material.

When a binding energy peak of sulfur included in the coating layer 13 is measured using (utilizing) X-ray photoelectron spectroscopy (XPS), the binding energy peak is shown at about 165 eV to about 168 eV.

XPS is one method of qualitatively analyzing elements included in a sample by measuring the binding energy of photoelectrons, which is an inherent property of an atom. In greater detail, when an X-ray photon having a specific energy is applied to the sample, photoelectrons are emitted from the sample, and at this point, the kinetic energy of the photoelectrons is measured to detect the binding energy, which is needed to emit photoelectrons from the sample. The binding energy varies (even for the same element) due to a difference in electronegativity, which occurs when the elements are subjected to different chemical environments. The chemical environment may vary depending on the shape and lattice structure of the molecule which contains the element.

Generally, when a binding energy peak of photoelectrons emitted in a $2P_{3/2}$ orbital energy level of sulfur is measured by XPS, the binding energy peak appears at 168.5 eV to 169.6 eV.

However, when a binding energy peak of sulfur included in the coating layer according to an embodiment of the present invention is measured by XPS, the binding energy peak is observed at about 165 eV to about 168 eV, and thus, it may be concluded that there are different binding energies for the same sulfur element. For instance, in the case of the sulfur included in the coating layer according to an embodiment of the present invention, the electronegativity of the sulfur decreases according to different surrounding environments, which in turn decreases the binding energy. The difference in surrounding environments results from a difference in the structure or shape of the molecule including the sulfur, or the presence or absence of an organic material in or near the molecule including the sulfur, or the like. For example, when an organic material having a substituent such as an aliphatic hydrocarbon (which has weak polarity) is located in or near the molecule including sulfur, the electronegativity of sulfur decreases and thus the binding energy of sulfur decreases. According to an embodiment, when the binding energy peak of sulfur is measured by XPS, the binding energy peak may be observed at about 166 eV to about 167.5 eV.

The core of the positive active material may be any suitable material generally used (utilized) as a positive active material. For example, the core may include any compound represented by any one of the following formulae: $Li_aA_{1-b}B_bD_2$ (wherein, $0.90 \le a \le 1$ and $0 \le b \le 0.5$); $Li_aE_{1-b}B_bO_{2-c}D_c$ (wherein, $0.90 \le a \le 1$, $0 \le b \le 0.5$, and $0 \le c \le 0.05$); $LiE_{2-b}B_bO_{4-c}D_c$ (wherein, $0 \le b \le 0.5$ and $0 \le c \le 0.05$); $Li_aNi_{1-b-c}Co_bB_cD_\alpha$ (wherein, $0.90 \le a \le 1$, $0 \le b \le 0.5$, $0 \le c \le 0.05$, and $0 < \alpha \le 2$); $Li_aNi_{1-b-c}Co_bB_cO_{2-\alpha}X_\alpha$ (wherein, $0.90 \le a \le 1$, $0 \le b \le 0.5$, $0 \le c \le 0.05$, and $0 < \alpha < 2$); $Li_aNi_{1-b-c}Co_bB_cO_{2-\alpha}X_2$ (wherein, $0.90 \le a \le 1$, $0 \le b \le 0.5$, $0 \le c \le 0.05$, and $0 < \alpha < 2$); $Li_aNi_{1-b-c}Mn_bB_cD_\alpha$ (wherein, $0.90 \le a \le 1$, $0 \le b \le 0.5$, $0 \le c \le 0.05$, and $0 < \alpha \le 2$); $Li_aNi_{1-b-c}Mn_bB_cO_{2-\alpha}X_\alpha$ (wherein, $0.90 \le a \le 1$, $0 \le b \le 0.5$, $0 \le c \le 0.05$, and $0 < \alpha < 2$); $Li_aNi_{1-b-c}Mn_bB_cO_{2-\alpha}X_2$ (wherein, $0.90 \le a \le 1$, $0 \le b \le 0.5$, $0 \le c \le 0.05$, and $0 < \alpha < 2$); $Li_aNi_bE_cG_dO_2$ (wherein, $0.90 \le a \le 1$, $0 \le b \le 0.9$, $0 \le c \le 0.5$, and $0.001 \le d \le 0.1$); $Li_aNi_bCo_cMn_dGeO_2$ (wherein, $0.90 \le a \le 1$, $0 \le b \le 0.9$, $0 \le c \le 0.5$, $0 \le d \le 50.5$, and $0.001 \le e \le 0.1$); $Li_aNiG_bO_2$ (wherein, $0.90 \le a \le 1$ and $0.001 \le b \le 0.1$); $Li_aCoG_bO_2$ (wherein, $0.90 \le a \le 1$, $0.001 \le b \le 0.1$); $Li_aMnG_bO_2$ (wherein, $0.90 \le a \le 1$, $0.001 \le b \le 0.1$); $Li_aMn_2G_bO_4$ (wherein, $0.90 \le a \le 1$ and $0.001 \le b \le 0.1$); $QO_2$; $QS_2$; $LiQS_2$; $V_2O_5$; $LiV_2O_5$; $LiLO_2$; $LiNiVO_4$; $Li_{(3-f)}J_2(PO_4)_3$ ($0 \le f \le 2$); $Li_{(3-f)}Fe_2(PO_4)_3$ ($0 \le f \le 2$); and $LiFePO_4$.

In the formulae above, A may be nickel (Ni), cobalt (Co), manganese (Mn), or a combination thereof; B may be aluminum (Al), Ni, Co, Mn, chromium (Cr), iron (Fe), Mg, strontium (Sr), vanadium (V), a rare earth metal element, or a combination thereof; D may be oxygen (O), fluorine (F), sulfur (S), phosphorus (P), or a combination thereof; E may be Co, Mn, or a combination thereof; X may be F, S, P, or a combination thereof; G may be Al, Cr, Mn, Fe, Mg, lanthanum (La), cerium (Ce), Sr, V, or a combination thereof; Q may be Ti, molybdenum (Mo), Mn, or a combination thereof; L may be Cr, V, Fe, Sc, Y, or a combination thereof; and J may be V, Cr, Mn, Co, Ni, Cu, or a combination thereof.

For example, the positive active material may be one of $LiCoO_2$, $LiMn_xO_{2x}$ (x=1, 2), $LiNi_{1-x}Mn_xO_{2x}$ ($0<x<1$), $LiNi_{1-x-y}Co_xMn_yO_2$ ($0 \le x \le 0.5$, $0 \le y \le 0.5$), and/or $FePO_4$.

The compounds (for the core of the positive active material) may have a coating layer formed on a surface thereof or may be mixed with a compound having a coating layer. The coating layer may include a coating element compound (a compound of a coating element), such as an oxide of a coating element, a hydroxide of a coating element, an oxyhydroxide of a coating element, an oxycarbonate of a coating element, or a hydroxycarbonate of a coating element. The compounds that form the coating layer may be amorphous or crystalline. As a coating element included in the coating layer, Mg, Al, Co, K, Na, Ca, Si, Ti, V, Sn, germanium (Ge), gallium (Ga), boron (B), arsenic (As), Zr, or a mixture thereof may be used (utilized). The coating layer may be formed using (utilizing) any one of various suitable coating methods that are performed using (utilizing) the compounds and the elements, and that do not adversely affect the properties of the positive active material. For example, spray coating, immersion, or the like, may be utilized. These coating methods are known to those of ordinary skill in the art.

According to an embodiment, the core may include a lithium nickel composite oxide. For example, the core may include a large amount of nickel, which may increase the capacity of the battery. According to an embodiment, an amount of nickel may be at least 60 mole % based on a total number of moles of metal elements excluding lithium included in the lithium nickel composite. For example, an amount of nickel may be at least 80 mole % based on a total number of moles of metal elements excluding lithium included in the lithium nickel composite.

As the amount of nickel included in the lithium composite metal oxide increases, an amount of $Ni^{2+}$ (which may substitute for the lithium) increases, which thereby facilitates the formation of NiO, which is an impurity. NiO is highly reactive, and thus, may react with the electrolyte. Two or more NiOs may be connected to locally form a three dimensional structure to thereby prevent (reduce or prevent) the diffusion of lithium ions. Also, to prepare a lithium composite metal oxide including a large amount of nickel, an excessive amount of $Li_2CO_3$ needs to be used (utilized), and thus, a large amount of residual lithium from $Li_2CO_3$ exists on the surface of the resulting lithium composite metal oxide. The residual lithium reacts with water or $CO_2$ to produce a base such as LiOH or $Li_2CO_3$, and the base may react with the electrolyte to generate gas such as $CO_2$. As a result, the internal pressure of the battery may increase and the lifespan properties and safety of the battery may decrease.

However, when a lithium composite metal oxide including a large amount of nickel is coated in the coating layer according to an embodiment, the structural stability of the positive active material may be improve due to the coating layer. Accordingly, the battery including the lithium composite metal oxide including a large amount of nickel may exhibit high capacity while preventing (reducing or preventing) a decrease in lifespan properties caused by a large amount of residual lithium ions.

For example, the core may include a lithium nickel composite oxide represented by Formula 1:

$Li_a(Ni_xM_y'M_z'')O_2$ <span>Formula 1</span>

In Formula 1, M' is at least one element selected from the group consisting of Co, Mn, Ni, Al, Mg, and Ti; M" is at least one element selected from the group consisting of Ca, Mg, Al, Ti, Sr, Fe, Co, Mn, Ni, Cu, Zn, Y, Zr, Nb, and B; $0.8 < a \leq 1.2$, $0.6 \leq x \leq 1$; $0 \leq y \leq 0.4$; $0 \leq z \leq 0.4$; and $x+y+z \leq 1.2$.

For example, the core may include a lithium nickel composite oxide represented by Formula 2:

$$Li_a(Ni_xCo_yMn_z)O_2 \qquad \text{Formula 2}$$

In Formula 2, $0.8 < a \leq 1.2$, $0.6 \leq x \leq 1$, $0 \leq y \leq 0.4$, $0 \leq z \leq 0.4$, and $x+y+z \leq 1.2$.

A 3-component-based lithium nickel cobalt manganese oxide represented by Formula 2 may include a combination of high capacity provided by a lithium nickel oxide, thermal stability and economic feasibility provided by a lithium manganese oxide, and stable electrochemical properties provided by a lithium cobalt oxide, thereby exhibiting good battery properties.

In addition to the lithium nickel composite oxide represented by Formula 1 or 2, the core may further include another positive active material having at least one different feature, such as composition, diameter, or the like (that is different from that of the lithium nickel composite oxide represented by Formula 1 or 2).

In the positive active material, the core may be a secondary particle formed by an aggregation of primary particles. The secondary particle may include holes at boundaries between the primary particles.

In the positive active material, an amount of sulfur may be about 0.01 wt % to about 10 wt %, for example, about 0.05 wt % to about 5 wt %. When the amount of sulfur is in or of the ranges described above, the amount of sulfur may be sufficient to prevent (reduce or prevent) structural changes in the surface of the positive active material, which may in turn prevent (reduce or prevent) a side reaction with the electrolyte. Also, the amount of the core in the positive active material may be greater than a threshold amount thereby preventing (reducing or preventing) a decrease in capacity of the positive active material. Accordingly, improved capacity and improved structural stability may be simultaneously achieved.

In the positive active material, the coating layer may further include at least one element selected from the group consisting of alkali metal, alkaline earth metal, transition metal, and Group 15 element. For example, the coating layer may further include at least one element selected from the group consisting of lithium (Li), sodium (Na), potassium (K), rubidium (Rb), cesium (Cs), magnesium (Mg), calcium (Ca), aluminum (Al), silicon (Si), tin (Sn), lead (Pb), manganese (Mn), iron (Fe), chromium (Cr), nickel (Ni), zinc (Zn), zirconium (Zr), thallium (Tl), and nitrogen (N).

Hereinafter, a method of preparing the positive active material, according to an embodiment of the present invention, will be described.

According to an embodiment, a method of preparing the positive active material includes coating a surface of a core with a coating solution including a sulfate compound to prepare a coated core; and heat treating the coated core to form a coating layer including a sulfur component on the core.

According to an embodiment, the method may further include washing the core with distilled water before coating the surface of the core with a coating solution.

The core may be prepared by calcining a metal hydroxide and a lithium salt. For example, the core may be prepared by a method including continuously inserting (feeding) an aqueous solution including a salt containing a desired metal (or one or more desired metals) in a co-precipitation environment to prepare a mixture (of the co-precipitated metal containing material); washing, filtering, and drying the mixture to prepare a metal hydroxide; mixing the metal hydroxide with a lithium salt; and calcining the mixture under general calcination conditions to prepare a lithium metal composite oxide, according to the desired positive active material composition. However, the method is not limited thereto, and the positive active material may be manufactured by any method generally used (utilized) in the art.

The core may include impurities, and when the core includes a lithium nickel composite oxide including a large amount of nickel, the core may include a large amount of residual lithium in addition to the impurities. Accordingly, before coating the surface of the core with a coating solution, the surface of the core may be washed with distilled water to remove the impurities and residual lithium. As a result, a decrease in stability and lifespan properties of the battery caused by the impurities and residual lithium may be prevented (reduced or prevented). Thereafter, the core may be dried at a temperature of about 80° C. to about 150° C. for about 1 hour to about 12 hours.

According to an embodiment, the core may include a lithium nickel composite oxide represented by Formula 1:

$$Li_a(Ni_xM'_yM''_z)O_2 \qquad \text{Formula 1}$$

In Formula 1, M' is at least one element selected from the group consisting of Co, Mn, Ni, Al, Mg, and Ti; M" is at least one element selected from the group consisting of Ca, Mg, Al, Ti, Sr, Fe, Co, Mn, Ni, Cu, Zn, Y, Zr, Nb, and B; $0.8 < a \leq 1.2$; $0.6 \leq x \leq 1$; $0 \leq y \leq 0.4$; $0 \leq z \leq 0.4$; and $x+y+z \leq 1.2$.

For example, the core may be a lithium nickel composite oxide represented by Formula 2:

$$Li_a(Ni_xCo_yMn_z)O_2 \qquad \text{Formula 2}$$

In Formula 2, $0.8 < a \leq 1.2$, $0.6 \leq x \leq 1$, $0 \leq y \leq 0.4$, $0 \leq z \leq 0.4$, and $x+y+z \leq 1.2$.

The coating solution may be prepared by mixing the sulfate compound in a solvent. The coating solution may be, for example, a solution in which the sulfate compound is dissolved in a solvent. The solvent is not particularly limited and may be any suitable solvent that may dissolve the sulfate compound. For example, the solvent may be water, ethanol, or methanol.

The sulfate compound may be any suitable compound that includes sulfate, for example, a salt including sulfate, and in this case, the sulfate compound in the coating solution may dissociate into negative ions including a sulfate group and counter ions thereof. By using (utilizing) the sulfate compound, a coating layer including a sulfur component (which has a binding energy peak of the sulfur at about 165 eV to about 168 eV in a $2P_{3/2}$ orbital as measured by XPS) may be formed.

According to an embodiment, the sulfate compound may further include at least one of an alkali metal, an alkaline earth metal, a transition metal, or a Group 15 element.

For example, the sulfate compound may be represented by Formula 3:

$$\left[ R-O-\underset{\underset{O}{\|}}{\overset{\overset{O}{\|}}{S}}-O \right]_a X_b \qquad \text{Formula 3}$$

In Formula 3, R may be a substituted or unsubstituted aliphatic hydrocarbon group; X may be at least one selected from the group consisting of an alkali metal, an alkaline earth metal, a Group 13 element, a Group 14 element, a transition metal, a rare earth element, and ammonium ion; $1 \leq a \leq 5$; and $1 \leq b \leq 5$.

When the sulfate compound is used (utilized) to form a coating layer, the sulfur in the coating layer may be in a chemical environment that is different from typical sulfur due to the effects of the aliphatic hydrocarbon group (represented by R). Accordingly, the electronegativity of the sulfur may decrease due to the aliphatic hydrocarbon group, such that the binding energy peak of photoelectrons emitted from an orbital energy level of sulfur measured by XPS may be about 165 eV to about 168 eV, for example, about 166 eV to about 167.5 eV.

In the sulfate compound represented by Formula 3, the aliphatic hydrocarbon group may be unsubstituted or may be substituted with a substituent. The substituent may be a halogen atom; an amino group; a cyano group; a nitro group; a C1-C8 alkyl group unsubstituted or substituted with a halogen atom; a C1-C8 alkoxy group unsubstituted or substituted with a halogen atom; a C2-C8 alkenyl group unsubstituted or substituted with a halogen atom; a C2-C8 alkenyloxy group unsubstituted or substituted with a halogen atom; a C2-C8 alkynyl group unsubstituted or substituted with a halogen atom; a C3-C10 cycloalkyl group unsubstituted or substituted with a halogen atom; a C3-C10 cycloalkoxy group unsubstituted or substituted with a halogen atom; a C3-C10 cycloalkenyl group unsubstituted or substituted with a halogen atom; a C2-C10 heterocycloalkyl group unsubstituted or substituted with a halogen atom; a C6-C10 aryl group unsubstituted or substituted with a halogen atom; a C6-C10 aryloxy group unsubstituted or substituted with a halogen atom; or a C2-C10 heteroaryl group unsubstituted or substituted with a halogen atom, but the aliphatic hydrocarbon group is not limited thereto.

According to an embodiment, the aliphatic hydrocarbon group may be a C1-C20 alkyl group; and X may be at least one element selected from the group consisting of $NH_4$, Li, Na, K, Rb, Cs, Mg, Ca, Al, Si, Sn, Pb, Mn, Fe, Cr, Ni, Zn, Zr, and Tl.

For example, the sulfate compound may include at least one compound selected from the group consisting of sodium dodecyl sulfate (SDS), lithium dodecyl sulfate (LDS), ammonium lauryl sulfate (ALS), and sodium lauryl sulfate (SLS).

Then, the coating solution may be mixed with the core to coat a surface of the core with the coating solution. The mixing of the coating solution and the core may be performed by a stirrer for about 1 hour to about 24 hours.

According to an embodiment, when the surface of the core is coated with a coating solution including the sulfate compound, the negative ions including the sulfate group may include both a hydrophobic portion (due to the aliphatic hydrocarbon group) and a hydrophilic portion (due to the sulfate group). The core may have hydrophilicity due to an oxide that is generally included therein, such that the sulfate group, which is a hydrophilic portion, is physically adsorbed on the surface of the core to cover the surface of the core. In this regard, since the aliphatic hydrocarbon group, which is a hydrophobic portion, is not adsorbed onto the surface of the core, the core and the coating may form a micelle structure. When the hydrophobic portion does not exist and only the hydrophilic portions exist (which may be united or aggregated) the surface of the core may not be uniformly coated. Conversely, when the sulfate compound includes a hydrophobic portion (such as an aliphatic hydrocarbon group having a long chain), according to an embodiment, aggregation of the sulfate compounds may be prevented (reduced or prevented) such that the surface of the core may be uniformly coated.

An amount of the sulfate compound may be about 0.01 parts by weight to about 10 parts by weight, for example, about 0.1 parts by weight to about 5 parts by weight, or 1 part by weight to about 3 parts by weight, based on 100 parts by weight of the core. When the amount of the sulfate compound is within one of the ranges described above, improved battery capacity may be obtained while the surface of the core may be sufficiently covered by the sulfate compound.

The coated core may be heat treated to form a coating layer including a sulfur component. The heat treatment conditions may be suitably adjusted and may include drying and calcination. For example, drying the coated core may be performed at a temperature of about 80° C. to about 150° C. for about 1 hour to about 12 hours. The drying may remove residual solvent.

According to an embodiment, calcination may be performed at a temperature of about 300° C. to about 1000° C. for about 2 hours to about 12 hours in air after drying. The calcination may be, for example, performed in an $O_2$ atmosphere. For example, the calcination may be performed by increasing the temperature up to a desired temperature over 1 hour to about 5 hours, and then maintaining the desired temperature for about 1 hour to about 10 hours. In an air atmosphere, the aliphatic hydrocarbon group in the sulfate compound may be carbonized, and a positive active material in which the coating layer including the sulfur component is integrated with the core may be obtained (due to the calcination). As the surface of the core is uniformly coated with the sulfate compound, the coating layer of the obtained positive active material may be a continuous coating layer, thereby improving the structural stability of the positive active material.

According to another embodiment, a positive electrode includes the positive active material described above.

The positive electrode may, for example, be manufactured by mixing the positive active material, a binder, and optionally, a conductor in a solvent to prepare a positive active material composition, which may then be molded into a certain shape or spread on a current collector (such as aluminum).

The binder used (utilized) in the positive active material composition is a component that facilitates binding of the positive active material to the conductor, and binding of the positive active material to the current collector. The binder may be added in an amount of about 1 part by weight to about 50 parts by weight based on 100 parts by weight of the positive active material. For example, the binder may be added in an amount of about 1 part by weight to about 30 parts by weight, about 1 part by weight to about 20 parts by weight, or about 1 part by weight to about 15 parts by weight, based on 100 parts by weight of the positive active material. The binder may be selected from polyvinylidene fluoride (PVdF), polyvinylidene chloride, polybenzimidazole, polyimide, polyvinyl acetate, polyacrylonitrile, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polystyrene, polymethyl methacrylate, polyaniline, acrylonitrile-butadiene-styrene, phenolic resin, epoxy resin, polyethylene terephthalate, polytetrafluoroethylene, polyphenylene sulfide, polyamide-imide, polyetherimide, polyethylene sulfone, polyamide, polyacetal, polyphenylene oxide, polybutylene terephthalate, ethylene-propylene-diene monomer (EPDM), sulfonated EPDM, styrene butadiene rubber (SBR), fluororubber, and a combination thereof, but the binder is not limited thereto.

The positive electrode provides a conductive pathway to the positive active material, and may selectively (optionally) further include a conductor that may improve the electrical conductivity. The conductor may be any suitable conductor generally used (utilized) in a lithium battery, and non-limiting examples thereof include carbonaceous materials (such as carbon black, acetylene black, Ketjen black, carbon fiber, or the like); metallic materials (such as a metal powder or metal fiber of copper, nickel, aluminum, or silver); conductive polymers (such as polyphenylene derivatives); and mixtures thereof. The amount of the conductor may be appropriately controlled. For example, the conductor may be added in such an amount that a weight ratio of the positive active material to the conductor is in about 99:1 to about 90:10.

The solvent may be N-methylpyrrolidone (NMP), acetone, water, or the like. An amount of the solvent may be about 1 part by weight to about 400 parts by weight based on 100 parts by weight of the positive active material. When the amount of the solvent is in the range described above, the process of forming the active material layer may be easy.

Also, the current collector may typically have a thickness of about 3 μm to about 500 μm. The current collector is not particularly limited as long as the current collector does not cause a chemical change in the battery and has suitable electrical conductivity. Non-limiting examples of the material for the current collector include copper, stainless steel, aluminum, nickel, titanium, calcined carbon, copper and stainless steel that are surface-treated with carbon, nickel, titanium, silver, or the like, an alloy of aluminum and cadmium, etc. Also, an uneven microstructure may be present on the surface of the current collector to enhance the binding strength of the positive active material. Also, the current collector may take various forms including a film, a sheet, a foil, a net, a porous structure, a foam structure, a non-woven structure, etc.

An aluminum current collector may be directly coated with the prepared positive active material composition; or the positive active material composition may be cast on a separate support, and then the positive active material film may be peeled off of the support and laminated on the aluminum current collector, which is then dried and pressed, and heat-treated under vacuum at a temperature of about 50° C. to about 250° C. to prepare a positive electrode. However, the positive electrode is not limited to the above and may have a shape other than the shape described above.

According to another embodiment, a lithium battery includes a positive electrode including the positive active material. For example, the lithium battery includes a positive electrode including the positive active material; a negative electrode facing the positive electrode; a separator between the positive electrode and the negative electrode; and an electrolyte. The lithium battery may be manufactured according to the following method.

First, a positive electrode is manufactured according to the manufacturing method of the positive electrode described above.

Then, a negative electrode may be manufactured in the same manner as the positive electrode, except that a negative active material is used (utilized) instead of the positive active material. Also, in the negative active material composition, the binder, conductor, and solvent may be the same as those used (utilized) in the positive electrode.

For example, the negative active material, the binder, the conductor, and the solvent may be mixed to prepare a negative active material composition, which may then be directly coated on a copper current collector to manufacture a negative electrode plate. Alternatively, the negative active material composition may be cast on a separate support, and the negative active material film may be peeled off of the support and laminated on the copper current collector to manufacture the negative electrode plate.

The negative active material may be any suitable negative active material for a lithium battery known in the art. For example, the negative active material may be at least one selected from the group consisting of a lithium metal, a metal alloyable with lithium, a transition metal oxide, a non-transition metal oxide, and a carbonaceous material.

For example, the metal alloyable with lithium may include Si, Sn, Al, Ge, Pb, Bi, Sb, a Si—Y alloy (where Y is an alkali metal, an alkaline earth metal, a Group 13 element, a Group 14 element, a transition metal, a rare earth metal element, or a combination thereof, but Y is not Si), or a Sn—Y alloy (where Y is an alkali metal, an alkaline earth metal, a Group 13 element, a Group 14 element, a transition metal, a rare earth metal element, or a combination thereof, but Y is not Sn). In some embodiments, the element Y may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), polonium (Po), or a combination thereof.

For example, the transition metal oxide may include a lithium titanium oxide, a vanadium oxide, a lithium vanadium oxide, or the like.

For example, the non-transition metal oxide may include $SnO_2$, $SiO_x$ (0<x<2), or the like.

The carbonaceous material may include a crystalline carbon, an amorphous carbon, or a combination thereof. Non-limiting examples of the crystalline carbon include graphite (such as natural graphite or synthetic graphite) having an irregular, flat, flake, spherical, or fiber shape. Non-limiting examples of the amorphous carbon include soft carbon, hard carbon, mesophase pitch carbide, and calcined coke.

Then, a separator to be disposed between the positive electrode and the negative electrode is prepared. The separator may be any suitable separator that is generally used (utilized) in a lithium battery. For example, the separator may include a material that has low resistance to the migration of ions from the electrolyte and good electrolytic solution-retaining capability. For example, the separator may include a material such as glass fiber, polyester, Teflon, polyethylene, polypropylene, polytetrafluoroethylene (PTFE), or a combination thereof, each of which may be nonwoven or woven. The separator may have a pore size of about 0.01 μm to about 10 μm, and a thickness of about 5 μm to about 300 μm.

The electrolyte may include a non-aqueous electrolyte and a lithium salt. Non-limiting examples of the non-aqueous electrolyte include a non-aqueous electrolytic solution, an organic solid electrolyte, an inorganic solid electrolyte, etc.

As the non-aqueous electrolytic solution, a polar aprotic organic solvent may be used (utilized), and examples of the polar aprotic organic solvent are N-methyl-2-pyrrolidone, propylene carbonate, ethylene carbonate (EC), butylene carbonate (BC), dimethyl carbonate (DMC), diethyl carbonate (DEC), ethyl methyl carbonate (EMC), gamma-butyrolactone (GBL), 1,2-dimethoxy ethane (DME), tetrahydrofuran (THF), 2-methyltetrahydrofuran, dimethyl sulfoxide (DMSO), 1,3-dioxolane (DOL), formamide, dimethylformamide, acetonitrile, nitromethane, methyl formic acid, methyl acetic acid, phosphate triester, trimethoxylmethane, dioxolane derivatives, sulfolane, methyl sulfolane, 1,3-dimethyl-2-imidazolidinone, propylene carbonate derivatives, tetrahydrofuran derivatives, ethers, methyl propionic acid, ethyl propionic acid, etc.

Non-limiting examples of the organic solid electrolyte include polyethylene derivatives, polyethylene oxide derivatives, polypropylene oxide derivatives, phosphate ester polymer, polyagitation lysine, polyester sulfide, polyvinyl alcohol, vinylidene polyfluoride, polymers having an ionic dissociable group, etc.

Non-limiting examples of the inorganic solid electrolyte include nitrides, halides, and sulfates of Li, such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, $Li_3PO_4$—$Li_2S$—$SiS_2$, or the like.

The lithium salt may be any one of various suitable lithium salts that are used (utilized) in lithium batteries. As a material that may be dissolved well in the non-aqueous electrolyte, for example, one or more of LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic carbonic acid lithium, 4 phenyl boric acid lithium, lithium imide, etc. may be used (utilized).

Also, to form an SEI layer on a surface of the negative electrode and maintain the same on the surface of the negative electrode, vinylene carbonate (VC), catechol carbonate (CC), or the like may be included. Optionally, the electrolyte may include a redox-shuttle additive such as n-butyl ferrocene or halogen-substituted benzene to prevent (reduce or prevent) overcharging. Optionally, the electrolyte may include an additive for forming a film such as cyclohexyl benzene or biphenyl. Optionally, the electrolyte may include a cation receptor (such as a crown ether-based compound) and an anion receptor (such as a boron-based compound). Optionally, the electrolyte may include a phosphate compound (such as trimethyl phosphate (TMP), tris (2,2,2-trifluoroethyl)phosphate (TFP), or hexamethoxy cyclotriphosphazene (HMTP)) that may be included as a flame retardant.

When desired, the electrolyte may include an additive such as tris(trimethylsilyl)phosphate (TMSPa), lithium difluoro oxalato borate (LiFOB), propane sultone (PS), succinonitrile (SN), $LiBF_4$, a silane compound having a functional group (such as acryl, amino, epoxy, methoxy, ethoxy, or vinyl) that is capable of forming a siloxane bond, or a silazane compound (such as hexamethyldisilazane, for example, PS, SN, and $LiBF_4$).

For example, lithium salts such as $LiPF_6$, $LiClO_4$, $LiBF_4$, or $LiN(SO_2CF_3)_2$ may be added to a mixed solvent containing a cyclic carbonate such as EC or PC (which is a highly dielectric solvent) and a linear carbonate such as DEC, DMC, or EMC (which is a low viscosity solvent) to prepare an electrolyte.

Figure 2:
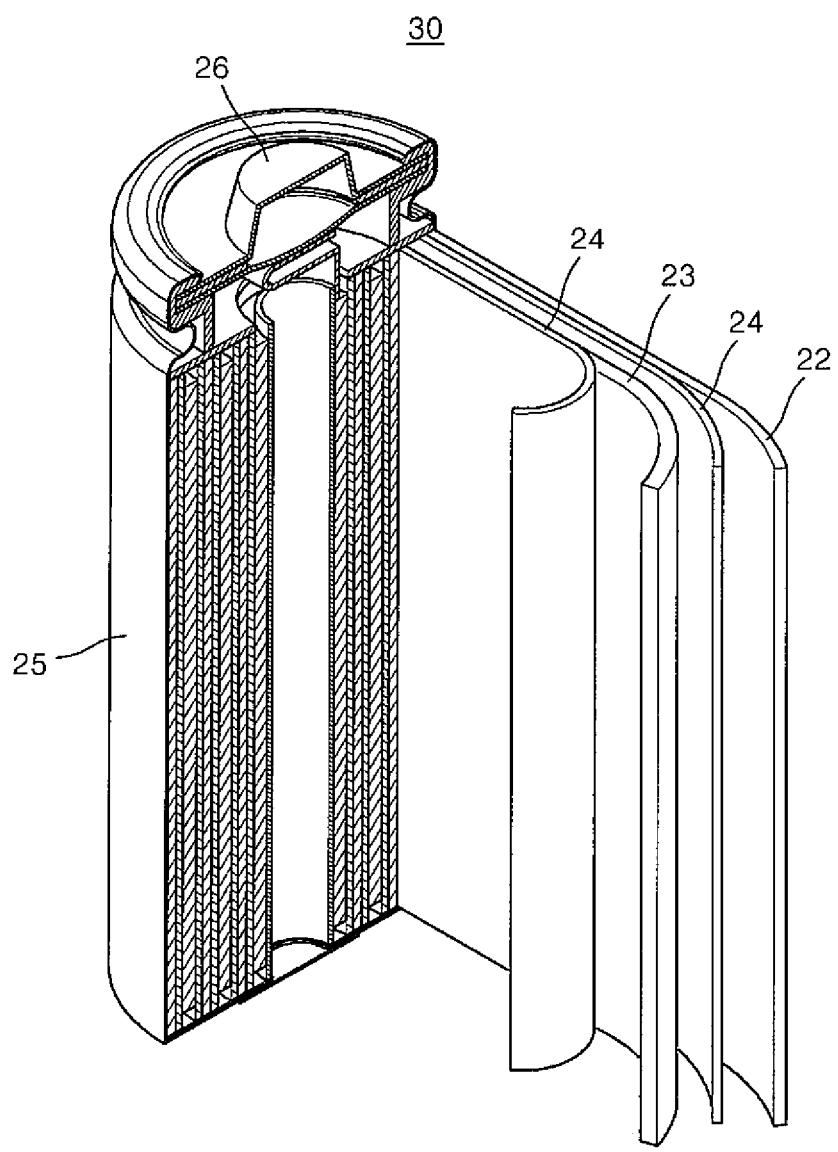
FIG. 2 is a schematic cross-sectional perspective view of a structure of a lithium battery according to an embodiment.

FIG. 2 is a schematic cross-sectional perspective view of a structure of a lithium battery 30 according to an embodiment.

Referring to FIG. 2, the lithium battery 30 includes a positive electrode 23, a negative electrode 22, and a separator 24 between the positive and negative electrodes 22 and 23. Also, the separator 24 may be further included on an external surface of the positive electrode 23 or the negative electrode 22 to prevent (reduce or prevent) internal short circuits. The positive electrode 23, the negative electrode 22, and the separator 24 are wound or folded, and housed in a battery case 25. Then, an electrolyte is injected into the battery case 25, followed by sealing the battery case 25 with an encapsulation member 26 to complete manufacture of the lithium battery 30. The battery case 25 may be a cylindrical case, a rectangular case, or a thin film case. The lithium battery 30 may be a lithium ion battery.

A lithium secondary battery may be categorized into a winding type or a stack type according to the shape of the electrode assembly; or cylindrical, rectangular, or pouch type according to the shape of the exterior battery case.

The lithium battery 30 may not only be used (utilized) as a power source of a small device, but also as a unit battery of a battery module (which includes a plurality of unit batteries) for a medium to large-sized device.

Examples of a battery module for a medium to large-sized device include power tools; xEVs including electric vehicles (EVs), hybrid electric vehicles (HEVs), and plug-in hybrid electric vehicles (PHEVs); electric motorcycles including E-bikes and E-scooters; electric golf carts; electric trucks; electric commercial vehicles; and electric power storage systems, but the medium to large-sized battery module device is not limited thereto. Furthermore, the lithium battery 30 may be used (utilized) in any device requiring a high capacity battery, high-power output, and high temperature operability.

Hereinafter example embodiments will be described with reference to examples and comparative examples. However, the examples are presented for illustrative purposes only and do not limit the scope of the present invention.

Preparation of a Positive Active Material

Example 1

100 parts by weight of $Li[Ni_{0.88}Co_{0.10}Mn_{0.02}]O_2$ powder (product of Ecopro) having an average diameter of 11.25 μm (based on PSD $D_{50}$ standard) was washed with distilled water to remove impurities and residual lithium. The washed $Li[Ni_{0.88}Co_{0.10}Mn_{0.02}]O_2$ powder was dried at a temperature of 120° C. for 4 hours. The dried $Li[Ni_{0.88}Co_{0.10}Mn_{0.02}]O_2$ powder was dispersed in 95 parts by weight of distilled water. 1 part by weight of sodium dodecyl sulfate (SDS) (a product of Aldrich) was added to 5 parts by weight of distilled water and then dissolved to prepare a coating solution. The coating solution was added to distilled water in which the $Li[Ni_{0.88}Co_{0.10}Mn_{0.02}]O_2$ was dispersed, stirred in a stirrer (a product of Jeio Tech) for 120 minutes to coat a surface of the washed $Li[Ni_{0.88}Co_{0.10}Mn_{0.02}]O_2$ powder with SDS. The $Li[Ni_{0.88}Co_{0.10}Mn_{0.02}]O_2$ powder coated with SDS was dried at a temperature of 100° C. for 12 hours to remove residual distilled water. Thereafter, the dried product obtained therefrom was calcined at a temperature of about 600° C. to about 700° C. for 5 hours in air to prepare a positive active material in which a coating layer was formed.

Example 2

A positive active material was prepared as in Example 1, except that a Li[Ni$_{0.80}$Co$_{0.10}$Al$_{0.10}$]O$_2$ powder (a product of Toda) having an average diameter of 7.8 μm (based on PSD D$_{50}$ standard) was used (utilized) instead of the Li[Ni$_{0.88}$Co$_{0.10}$Mn$_{0.02}$]O$_2$ powder (a product of Ecopro).

Example 3

A positive active material was prepared as in Example 1, except that a Li[Ni$_{0.85}$Co$_{0.12}$Mn$_{0.03}$]O$_2$ powder (a product of SMM) having an average diameter of 5.6 μm (based on PSD D$_{50}$ standard) was used (utilized) instead of the Li[Ni$_{0.88}$Co$_{0.10}$Mn$_{0.02}$]O$_2$ powder (a product of Ecopro).

Example 4

A positive active material was prepared as in Example 1, except that lithium dodecyl sulfate (LDS) (a product of Aldrich) was used (utilized) instead of SDS.

Example 5

A positive active material was prepared as in Example 1, except that ammonium lauryl sulfate (ALS) (a product of Aldrich) was used (utilized) instead of SDS.

Example 6

A positive active material was prepared as in Example 1, except that 0.1 parts by weight of SDS was used (utilized) instead of 1 part by weight of SDS.

Example 7

A positive active material was prepared as in Example 1, except that 0.3 parts by weight of SDS was used (utilized) instead of 1 part by weight of SDS.

Example 8

A positive active material was prepared as in Example 1, except that 0.5 parts by weight of SDS was used (utilized) instead of 1 part by weight of SDS.

Example 9

A positive active material was prepared as in Example 1, except that 3 parts by weight of SDS was used (utilized) instead of 1 part by weight of SDS.

Comparative Example 1

Li[Ni$_{0.88}$Co$_{0.10}$Mn$_{0.02}$]O$_2$ powder (a product of Ecopro) was used (utilized) as a positive active material.

Comparative Example 2

Li[N$_{0.80}$Co$_{0.10}$Al$_{0.10}$]O$_2$ powder (a product of Toda) was used (utilized) as a positive active material.

Comparative Example 3

Li[Ni$_{0.85}$Co$_{0.12}$Mn$_{0.03}$]O$_2$ powder (a product of SMM) was used (utilized) as a positive active material.

Comparative Example 4

Li[Ni$_{0.88}$Co$_{0.10}$Mn$_{0.02}$]O$_2$ powder (a product of Ecopro) was washed with distilled water to remove impurities and residual lithium. The washed Li[Ni$_{0.88}$Co$_{0.10}$Mn$_{0.02}$]O$_2$ powder was dried at a temperature of about 80° C. to about 120° C. for about 1 hour to about 12 hours to prepare a positive active material.

Comparative Example 5

A positive active material was prepared as in Comparative Example 4, except that Li[Ni$_{0.80}$Co$_{0.10}$Al$_{0.10}$]O$_2$ powder (a product of Toda) was used (utilized) instead of the Li[Ni$_{0.88}$Co$_{0.10}$Mn$_{0.02}$]O$_2$ powder (a product of Ecopro).

Comparative Example 6

A positive active material was prepared as in Comparative Example 4, except that Li[Ni$_{0.85}$Co$_{0.12}$Mn$_{0.03}$]O$_2$ powder (a product of SMM) was used (utilized) instead of the Li[Ni$_{0.88}$Co$_{0.10}$Mn$_{0.02}$]O$_2$ powder (a product of Ecopro).

Comparative Example 7

A positive active material was prepared as in Example 1, except that sodium sulfate (Na$_2$SO$_4$) (a product of Aldrich) was used (utilized) instead of SDS.

Comparative Example 8

A positive active material was prepared in the same manner as in Example 1, except that SDS was not used (utilized).

Evaluation Example 1: Evaluation of Surface Properties by XPS

With respect to the positive active materials prepared in Examples 1 to 4 and Comparative Examples 1 to 6, XPS was used (utilized) to measure the binding energy of the sulfur included in the coating layer of the positive active material. The XPS analysis results of the positive active materials prepared in Example 1, Example 4, Comparative Example 1, Comparative Example 4, and Comparative Example 7 are shown in Table 1 and FIG. 3.

TABLE 1

|  | Component of the coating solution | Binding energy of S (eV) |
|---|---|---|
| Example 1 | SDS 1 parts by weight | 166.7 |
| Example 4 | LDS 1 parts by weight | 166.9 |
| Comparative Example 1 | — | 168.8 |
| Comparative Example 4 | — | 168.8 |
| Comparative Example 7 | 1 part by weight of sodium sulfate | 168.8 |

Figure 3:
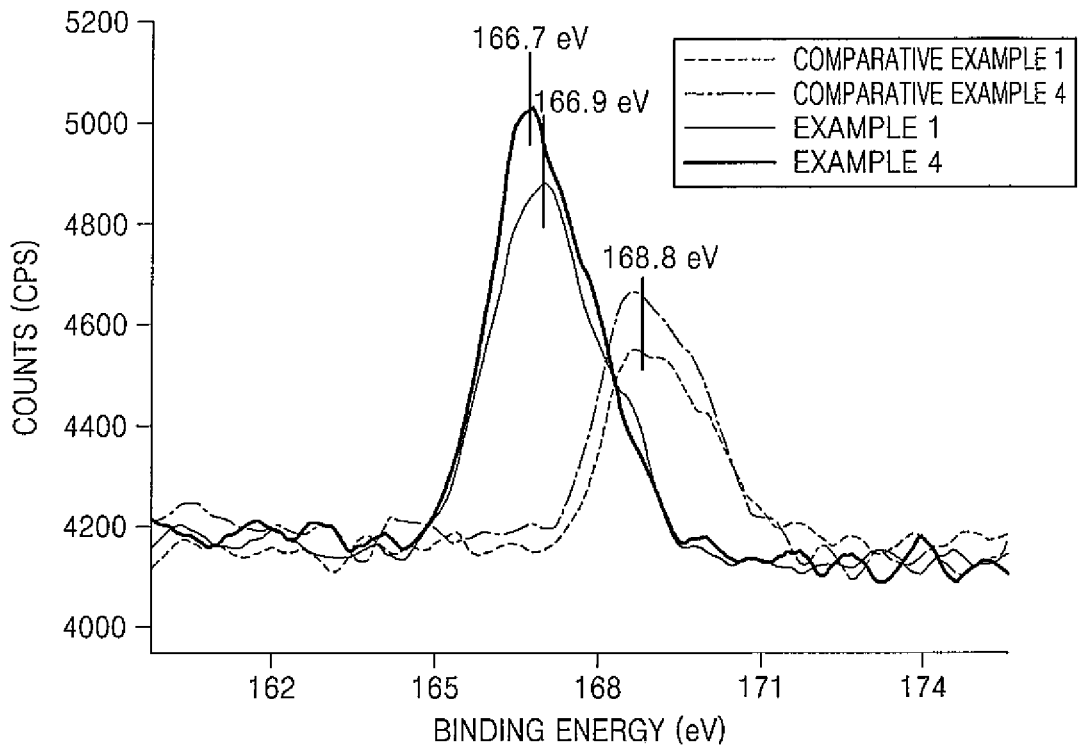
FIG. 3 is a graph comparing the XPS measurement results of the positive active materials manufactured in Example 1, Example 4, Comparative Example 1, and Comparative Example 4.

As shown in Table 1 and FIG. 3, the binding energy of sulfur decreases when a surface of the core is coated with SDS and LDS, compared to when a surface of the core is not coated, and when a surface of the core is coated with sodium sulfate. Chemical movement in XPS indicates different binding energies even for the same element depending on the chemical environment that the element is subjected to. Thus, it may be concluded that the chemical environment of the surface of a positive active material coated with SDS and LDS may be different from the chemical environment of the surface of a positive active material coated with sodium sulfate. In other words, when the surface of the core is coated with SDS and LDS, the decrease in the binding energy of sulfur resulted from the decrease in electronegativity of the sulfur (possibly) due to a remaining alkyl group after calcination, compared to when the surface of the core is not coated and when the core is coated with sodium sulfate.

Manufacturing a Positive Electrode and a Lithium Battery—A Coin-Type Half Cell

Example 10

(Preparation of a Positive Electrode)

The positive active material prepared in Example 1, PVdF as a binder, and a carbonaceous conductor (Denka Black) as a conductor were mixed at a weight ratio of 90:5:5, and N-methyl pyrrolidone was added in an amount of 60 wt % (of solids) to adjust the viscosity, to thereby prepare a positive electrode slurry.

A coating of the positive electrode slurry having a thickness of 40 μm was formed on an aluminum current collector having a thickness of 15 μm by using (utilizing) a method generally known in the art. The aluminum current collector, on which the coating of the slurry was formed, was dried at room temperature, dried again at a temperature of 120° C., and then rolled and punched to prepare a positive electrode for use (utilization) in a coin-type half cell.

(Manufacturing a Lithium Secondary Battery)

The positive electrode, lithium metal as a counter electrode, and a propylene separator having a thickness of 14 μm were used (utilized), and an electrolyte was injected therein, and the resultant was pressed to manufacture a 2032 standard coin cell. In this regard, the electrolyte was a solution in which $LiPF_6$ was dissolved to a concentration of 1.10 M in a mixed solvent of EC, DEC, and fluoroethylene carbonate (FEC) (a volume ratio of 5:70:25 of EC:DEC:FEC).

Examples 11 to 18

Lithium secondary batteries are manufactured as in Example 10, except that the positive active materials manufactured in Examples 2 to 9 were used (utilized), respectively.

Comparative Examples 9 to 16

Lithium secondary batteries were manufactured as in Example 10, except that the positive active materials prepared in Comparative Examples 1 to 8 were used (utilized), respectively.

Evaluation Example 2: Evaluation of Lifespan Properties According to the Presence or Absence of a Coating Layer The coin cells manufactured in Examples 10-12 and Comparative Examples 9-14 were charged at a constant current of 0.1 C at a temperature of 25° C. until the voltage reached 4.3 V. Then, the coin cells were discharged at a constant current of 0.1 C until the voltage reached 2.8 V (formation process).

Then, the coin cells were charged at a constant current of 0.2 C until the voltage reached 4.3 V, and then the coin cells were charged at a constant voltage until the current reached 0.05 C while maintaining the voltage of 4.3 V. Thereafter, the coin cells were discharged at a constant current of 0.2 C until the voltage reached 2.8 V (rating process).

Lithium batteries to which the formation and rating processes were applied were charged at a constant current of 0.5 C at a temperature of 25° C. until the voltage reached 4.3 V, and then the lithium batteries were charged at a constant voltage until the current reached 0.05 C while maintaining the voltage of 4.3 V. Then, the charge and discharge cycle (including discharging the lithium batteries at a constant current of 0.5 C until the voltage reached 3.0 V) was repeated 50 times.

Figure 4:
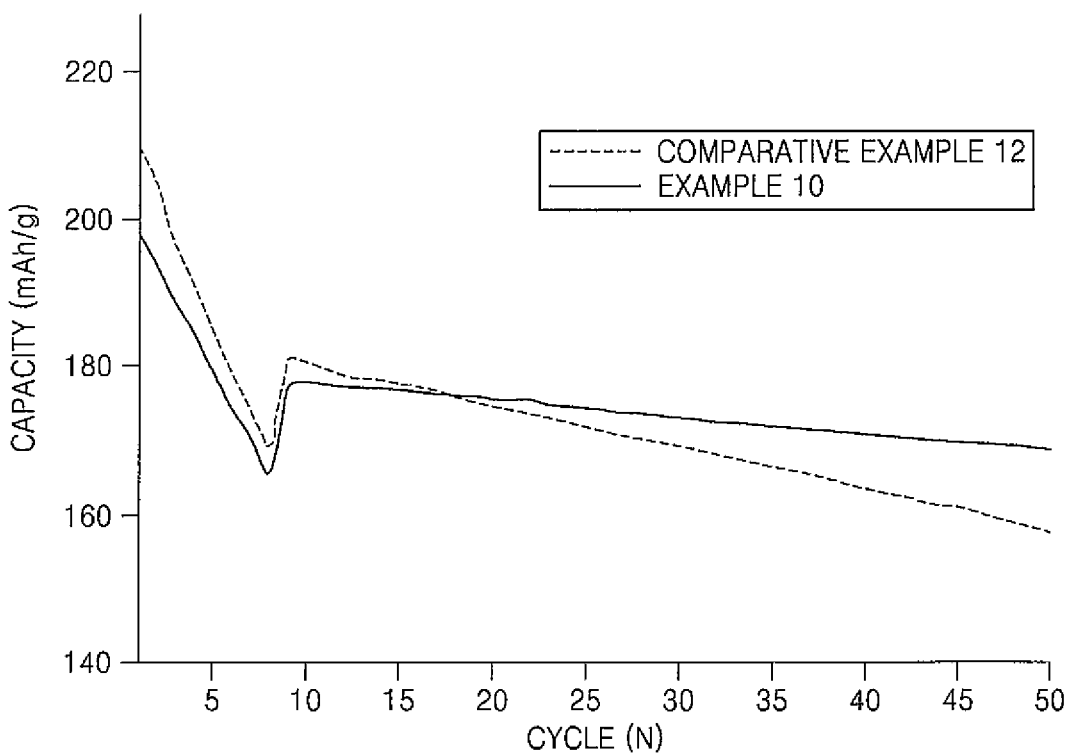
FIG. 4 is a graph comparing capacity according to the number of cycles of the coin-type half cells manufactured in Example 10 and Comparative Example 12.
Figure 5:
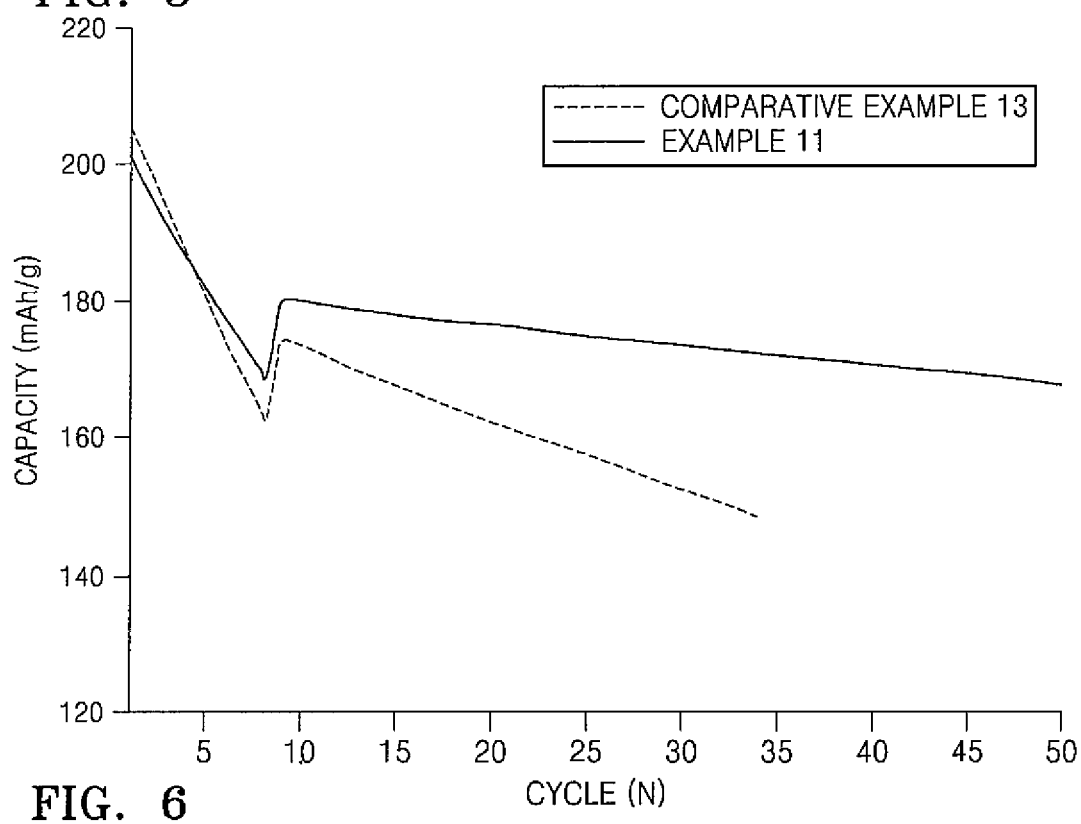
FIG. 5 is a graph comparing capacity according to the number of cycles of the coin-type half cells manufactured in Example 11 and Comparative Example 13.
Figure 6:
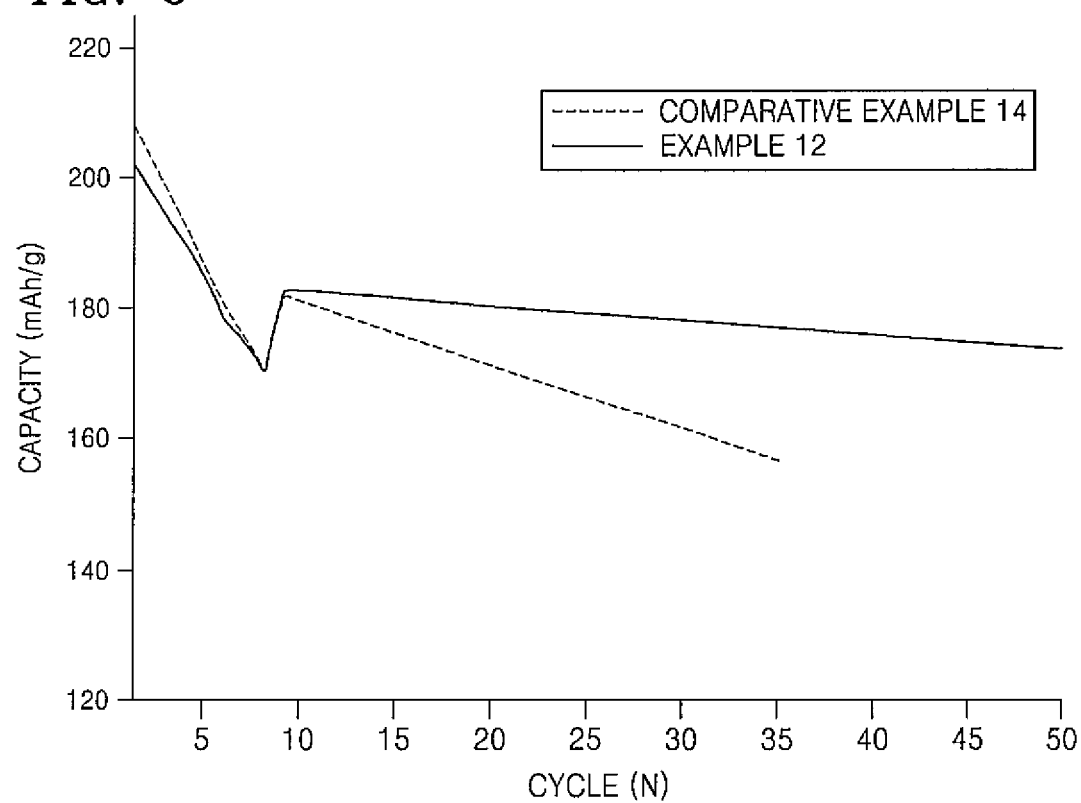
FIG. 6 is a graph comparing capacity according to the number of cycles of the coin-type half cells manufactured in Example 12 and Comparative Example 14.
Figure 7:
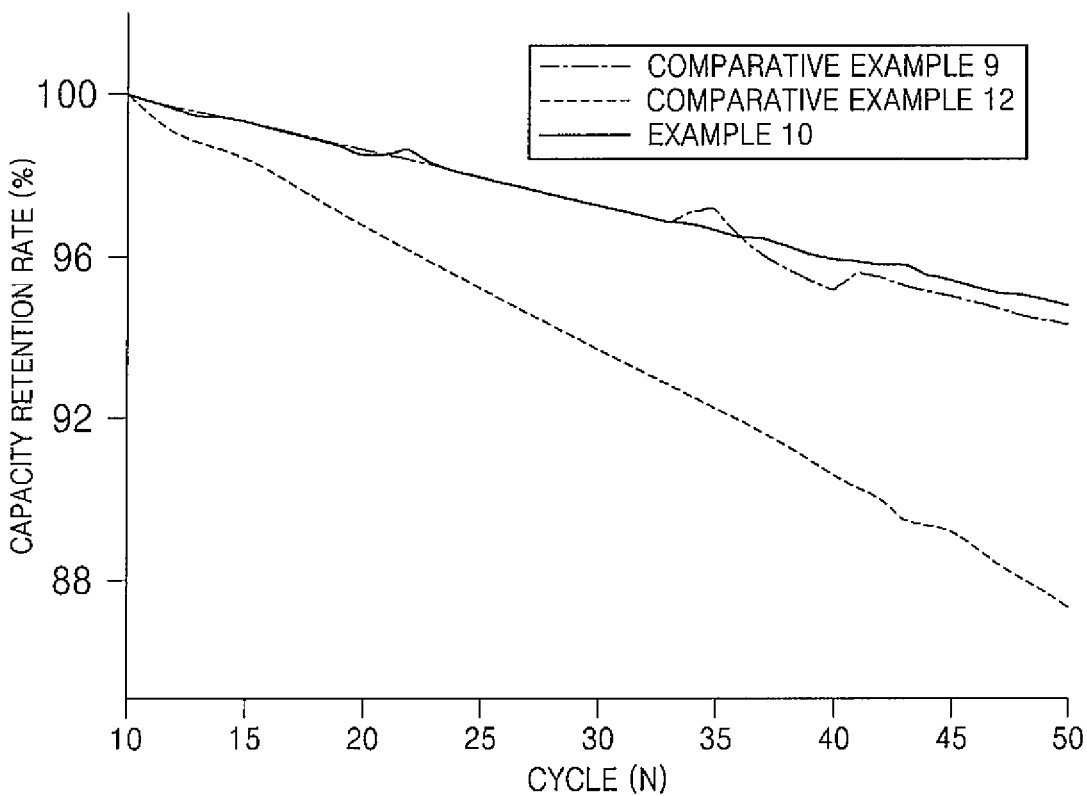
FIG. 7 is a graph comparing the capacity retention rate according to the number of cycles of the coin-type half cells manufactured in Example 10, Comparative Example 9, and Comparative Example 12.
Figure 8:
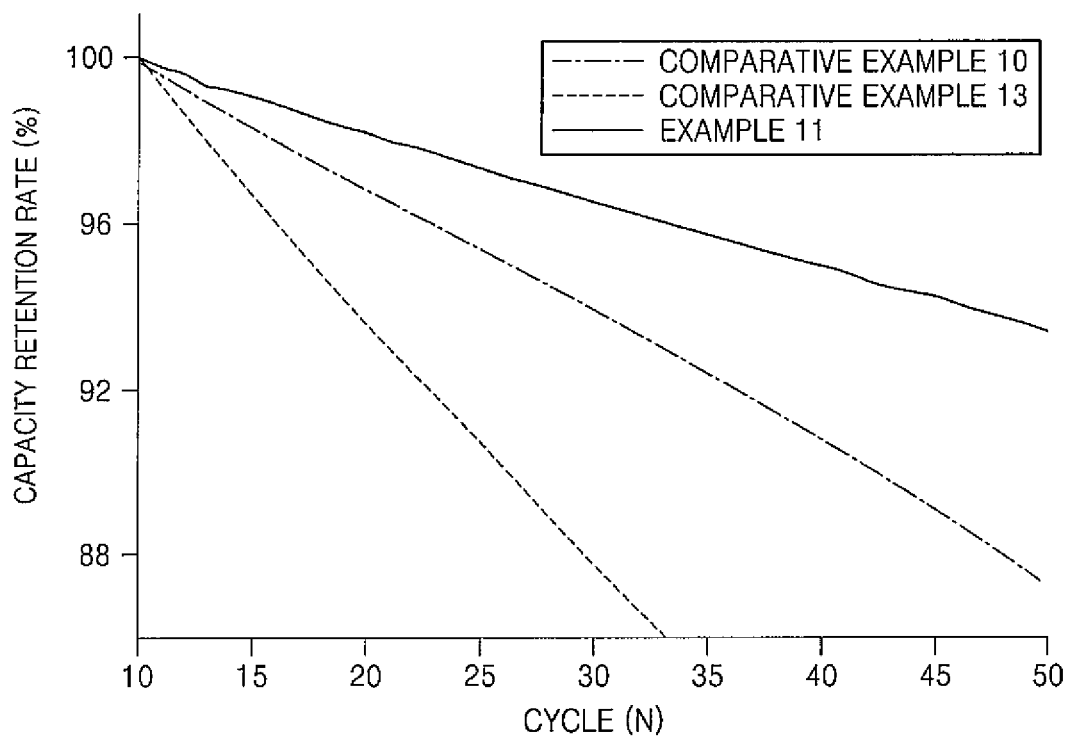
FIG. 8 is a graph comparing the capacity retention rate according to the number of cycles of the coin-type half cells manufactured in Example 11, Comparative Example 10, and Comparative Example 13.
Figure 9:
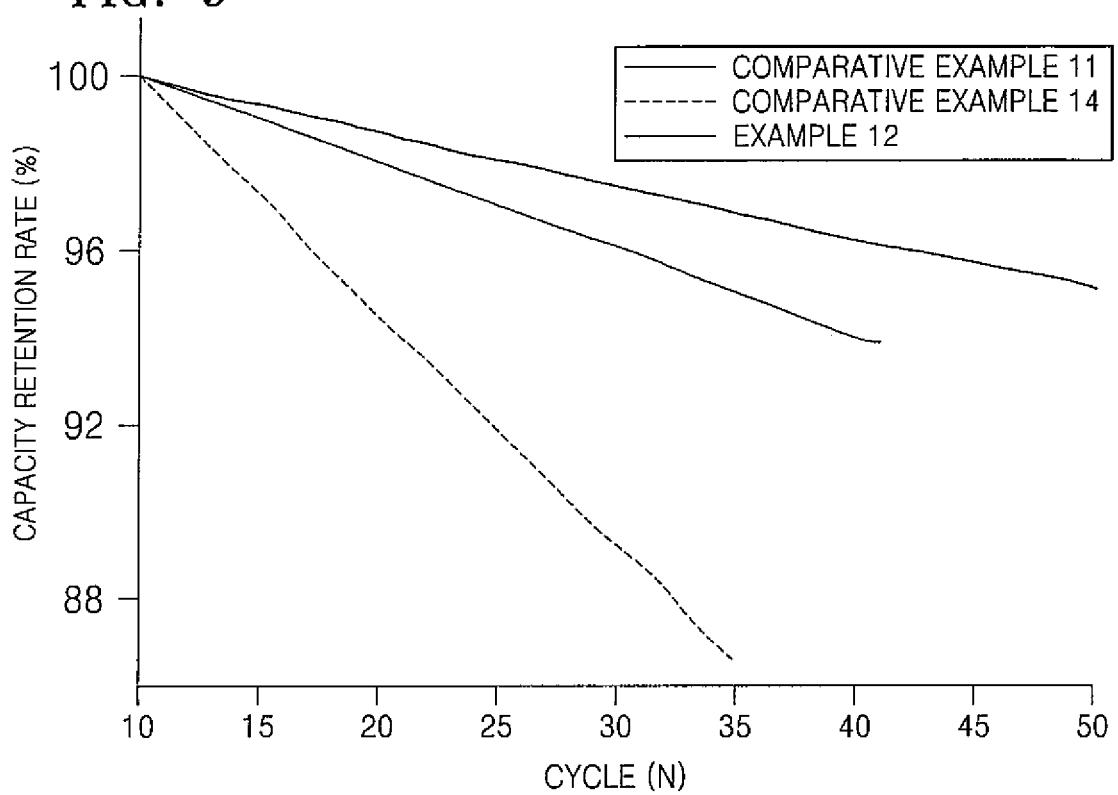
FIG. 9 is a graph comparing the capacity retention rate according to the number of cycles of the coin-type half cells manufactured in Example 12, Comparative Example 11, and Comparative Example 14.

The capacities of the coin-type half-cells manufactured in Examples 10-12 and Comparative Examples 12-14 were measured, and the results obtained therefrom are shown in FIGS. 4 to 6. The capacity retention rates (CRR) of the coin-type half-cells manufactured in Examples 10-12 and Comparative Examples 9-14 were measured, and the results obtained therefrom are shown in FIGS. 7 to 9. The CRR may be defined by Equation 1.

$$\text{CRR [\%]} = [\text{discharge capacity in each cycle/discharge capacity in } 1^{st} \text{ cycle}] \times 100 \quad \text{Equation 1}$$

As shown in FIGS. 4 to 6, the positive active materials according to Examples 10-12, in which a coating layer was formed on a core after washing the core, showed higher capacity during a cycle than the positive active materials prepared in Comparative Examples 12-14, in which a coating layer was not formed. Accordingly, it may be concluded that the loss of battery capacity in a battery including a positive active material having a large amount of nickel, decreases due to the presence of a coating layer according to an embodiment of the present invention.

Also, as shown in FIGS. 7 to 9, the positive active materials prepared in Examples 10-12, in which a coating layer was formed on a core, have substantially improved CRR as compared to the positive active materials prepared in Comparative Examples 8-13, in which a coating layer was not formed. Accordingly, due to a uniform coating layer formed from SDS on a surface of the positive active material, and despite a large amount of nickel in the core, changes in the surface structure of the positive active material during charge and discharge may be prevented (reduced or prevented), the reactivity to the electrolyte may be decreases, and thus lifespan properties may be improved.

Evaluation Example 3: Evaluation of Lifespan Properties According to Types of Sulfate Compounds The lifespan properties of the coin-type half cells manufactured in Example 10, Examples 13-14, Comparative Example 12, and Comparative Example 15 were measured by repeating the cycle described in Evaluation Example 2 50 times. The capacities and CRRs obtained therefrom are shown in FIGS. 10 and 11.

Figure 10:
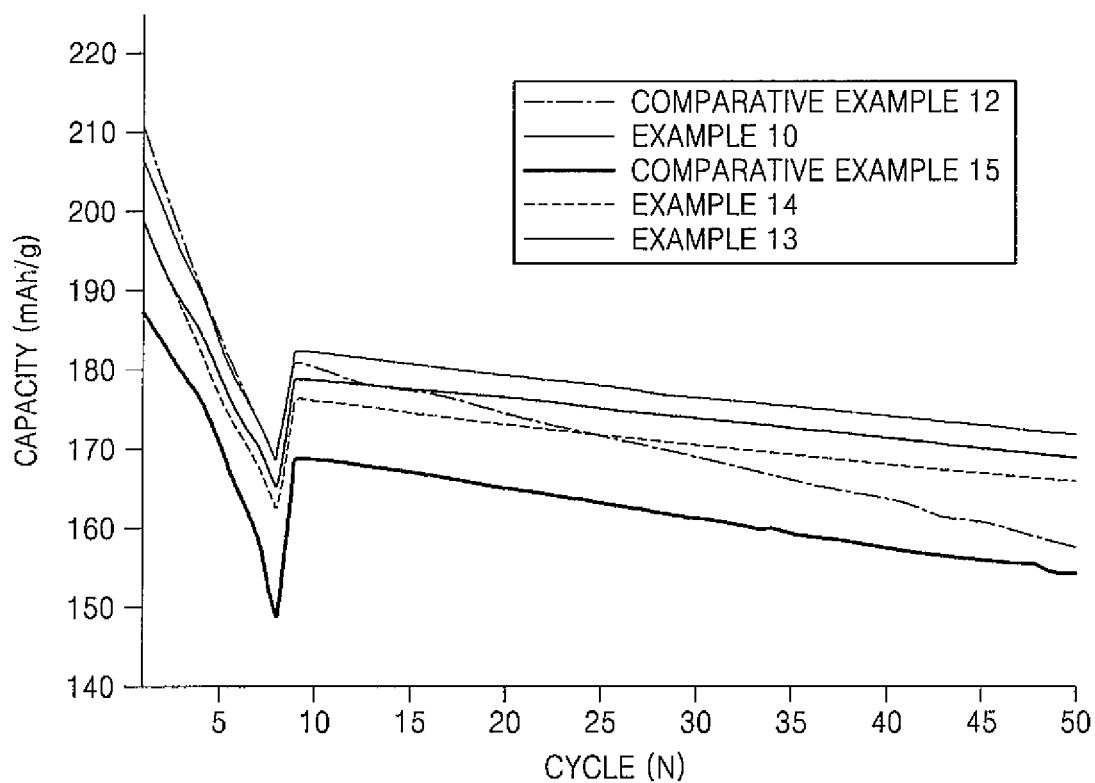
FIG. 10 is a graph comparing capacity according to the number of cycles of the coin-type half cells manufactured in Example 10, Examples 13 and 14, Comparative Example 12, and Comparative Example 15.

As shown in FIG. 10, the positive active materials prepared in Example 10 and Examples 13 and 14 (in which a coating layer was formed using (utilizing) a sulfate compound) showed high capacity during a cycle compared to the positive active material prepared in Comparative Example 12 (in which a coating layer was not formed), and the positive active material prepared in Comparative Example 15 (in which a coating layer was formed using (utilizing) sodium sulfate). More particularly, when a coating layer was formed using (utilizing) a sulfate compound, it may be concluded that capacity was substantially high starting from an initial capacity, compared to when a coating layer was formed using (utilizing) sodium sulfate.

Figure 11:
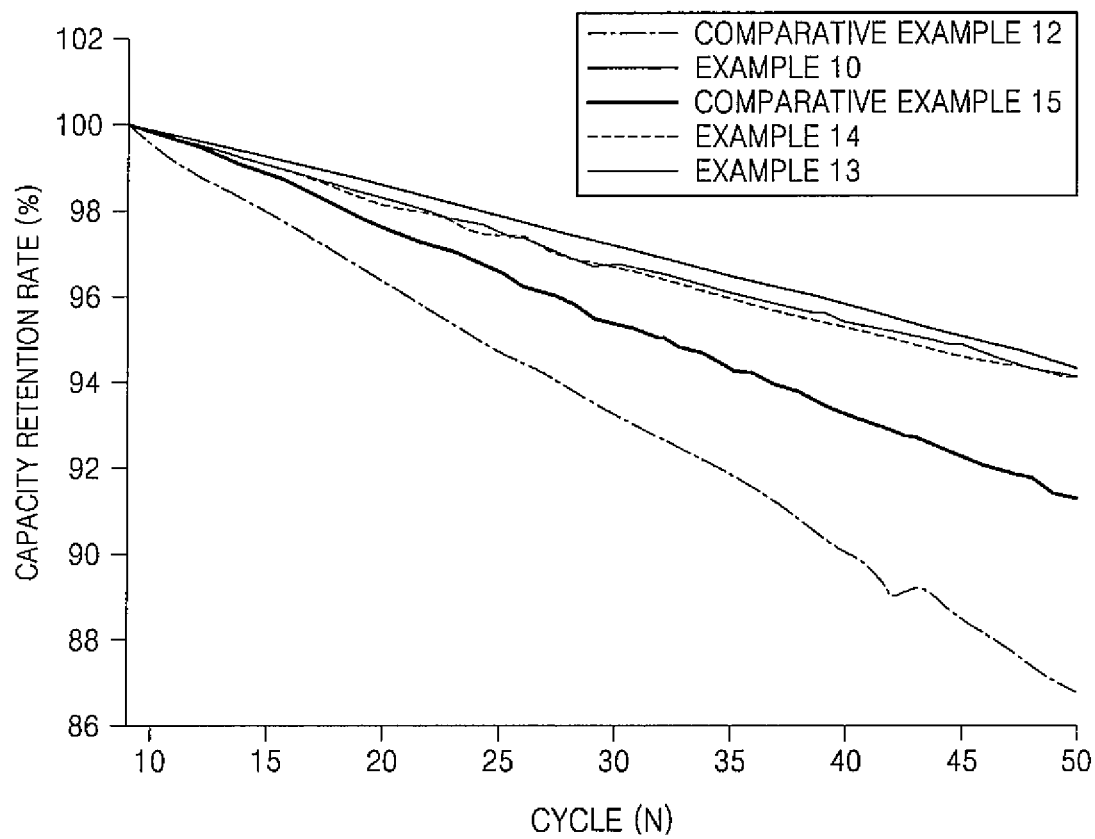
FIG. 11 is a graph comparing the capacity retention rate according to the number of cycles of the coin-type half cells manufactured in Example 10, Examples 13 and 14, Comparative Example 12 and Comparative Example 15.

Also, as shown in FIG. 11, the positive active materials prepared in Example 10 and Examples 13 and 14 (in which a coating layer was formed using (utilizing) a sulfate compound) showed substantially improved CRR as compared to the positive active material prepared in Comparative Example 15 (in which a coating layer was formed using (utilizing) sodium sulfate). Accordingly, a coating layer formed using (utilizing) a sulfate compound having a long alkyl group showed improved stability in the positive active material as compared to a coating layer formed using (utilizing) an inorganic material such as sodium sulfate.

Evaluation Example 4: Evaluation of Lifespan Properties According to an Amount of a Sulfate Compound Lifespan properties of the coin-type half cells manufactured in Example 10, Examples 15-18, Comparative Example 12, and Comparative Example 16 were measured by repeating the cycle described in Evaluation Example 2 40 times. The CRR obtained therefrom is shown in FIG. 12.

Figure 12:
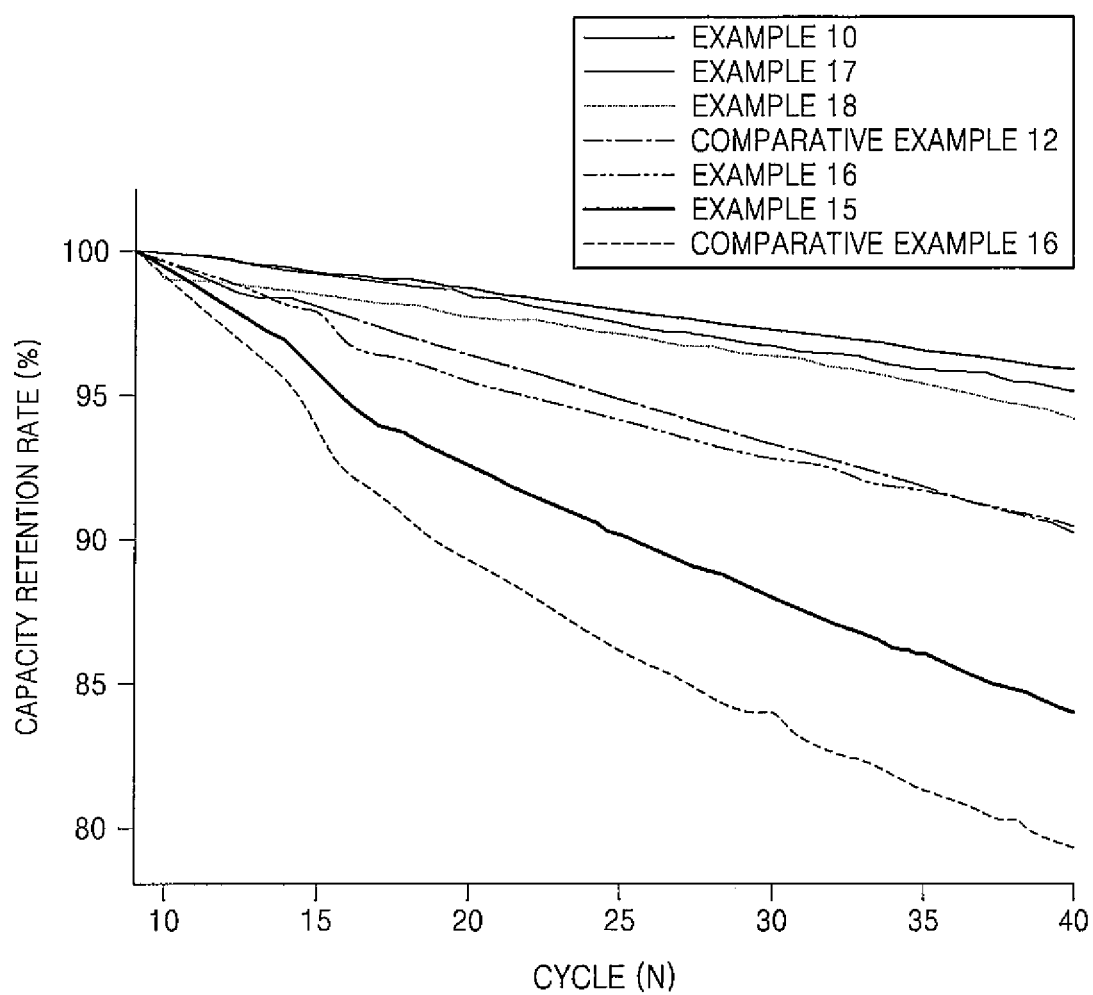
FIG. 12 is a graph comparing the capacity retention rate according to the number of cycles of the coin-type half cells manufactured in Example 10, Examples 15-18, Comparative Example 12, and Comparative Example 16.

As shown in FIG. 12, when a coating layer is formed using (utilizing) a certain amount of the sulfate compound, the improvement in the stability of the positive active material due to the coating layer may be increased or maximized.

As described above, when measured by XPS, the positive active material according to an embodiment of the present invention may include a coating layer containing sulfur on surface of the core, and the sulfur may have a binding energy peak of about 165 eV to about 168 eV, which improves the structural stability of the positive active material. Therefore, according to one or more embodiments of the present invention, a lithium battery including the positive active material may have improved lifespan properties.

It should be understood that the example embodiments described herein should be considered in a descriptive sense only and not for purposes of limitation. Descriptions of features or aspects within each embodiment should typically be considered as available for other similar features or aspects in other embodiments.

While one or more embodiments of the present invention have been described herein, it will be understood by those of ordinary skill in the art that various changes may be made to the described embodiments without departing from the spirit and scope of the present invention as defined by the following claims, and equivalents thereof.

What is claimed is:

1. A positive active material comprising:
   a core; and
   a carbonized coating layer on the core, the carbonized coating layer comprising a carbonized sulfur (S) component integrated with the core, the carbonized sulfur component comprising a carbonized aliphatic group, wherein:
   when measured by X-ray photoelectron spectroscopy (XPS), a binding energy peak of the sulfur is observed at about 165 eV to about 168 eV, and
   the positive active material contains about 0.05 wt % to about 10 wt % sulfur based on a total weight of the positive active material.

2. The positive active material according to claim 1, wherein the core comprises a lithium nickel composite oxide.

3. The positive active material according to claim 2, wherein an amount of nickel is at least 60 mole % based on a total number of moles of metal atoms except for lithium in the lithium nickel composite oxide.

4. The positive active material according to claim 1, wherein the core comprises a lithium nickel composite oxide represented by Formula 1:

$$Li_a(Ni_xM'_yM''_z)O_2 \qquad \text{Formula 1}$$

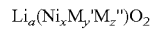

wherein, M' is at least one element selected from the group consisting of Co, Mn, Ni, Al, Mg, and Ti; and M" is at least one element selected from the group consisting of Ca, Mg, Al, Ti, Sr, Fe, Co, Mn, Ni, Cu, Zn, Y, Zr, Nb, and B, $0.8<a\leq1.2$, $0.6\leq x\leq1$, $0\leq y\leq0.4$, $0\leq z\leq0.4$, and $x+y+z\leq1.2$.

5. The positive active material according to claim 4, wherein the core comprises a lithium nickel composite oxide represented by Formula 2:

$$Li_a(Ni_xCo_yMn_z)O_2 \qquad \text{Formula 2}$$

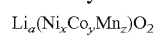

$0.8<a\leq1.2$, $0.6\leq x\leq1$, $0\leq y\leq0.4$, $0\leq z\leq0.4$, and $x+y+z\leq1.2$.

6. The positive active material according to claim 1, wherein the coating layer further comprises at least one element selected from the group consisting of an alkali metal, an alkaline earth metal, a transition metal, and a Group 15 element.

7. The positive active material according to claim 1, wherein the coating layer further comprises at least one element selected from the group consisting of lithium (Li), sodium (Na), potassium (K), rubidium (Rb), cesium (Cs), magnesium (Mg), calcium (Ca), aluminum (Al), silicon (Si), tin (Sn), lead (Pb), manganese (Mn), iron (Fe), chromium (Cr), nickel (Ni), zinc (Zn), zirconium (Zr), thallium (TI), and nitrogen (N).

8. The positive active material according to claim 1, wherein the coating layer is a continuous coating layer.

9. A positive electrode comprising the positive active material according to claim 1.

10. A lithium battery comprising the positive electrode according to claim 9.

* * * * *